US012744277B2

(12) United States Patent
Zheng et al.

(10) Patent No.: US 12,744,277 B2
(45) Date of Patent: Sep. 22, 2026

(54) BATTERY CELL, BATTERY, AND ELECTRICAL DEVICE

(71) Applicant: CONTEMPORARY AMPEREX TECHNOLOGY (HONG KONG) LIMITED, Hong Kong (CN)

(72) Inventors: Donglai Zheng, Ningde (CN); Dongyang Shi, Ningde (CN); Hao Ma, Ningde (CN); Baiqing Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 569 days.

(21) Appl. No.: 18/353,987

(22) Filed: Jul. 18, 2023

(65) Prior Publication Data

US 2023/0361415 A1 Nov. 9, 2023

Related U.S. Application Data

(63) Continuation of application No. PCT/CN2022/123367, filed on Sep. 30, 2022.

(30) Foreign Application Priority Data

Nov. 1, 2021 (WO) ................ PCT/CN2021/128005

(51) Int. Cl.

*H01M 50/30* (2021.01)
*H01M 50/102* (2021.01)

(Continued)

(52) U.S. Cl.

CPC ......... *H01M 50/30* (2021.01); *H01M 50/102* (2021.01); *H01M 50/169* (2021.01); *H01M 50/183* (2021.01); *H01M 2220/20* (2013.01)

(58) Field of Classification Search

None

See application file for complete search history.

(56) References Cited

U.S. PATENT DOCUMENTS

| | | | |
|---|---|---|---|
| 7,553,581 | B2 | 6/2009 | Sugimune et al. |
| 2004/0258989 | A1 | 12/2004 | Lee |
| 2004/0265683 | A1 | 12/2004 | Merrill et al. |

FOREIGN PATENT DOCUMENTS

| | | |
|---|---|---|
| CN | 1574418 A | 2/2005 |
| CN | 1619860 A | 5/2005 |

(Continued)

OTHER PUBLICATIONS

International Search Report for International Application PCT/CN2021/128005, mailed May 27, 2022.

(Continued)

*Primary Examiner* — Carlos Barcena

(74) *Attorney, Agent, or Firm* — Ladas & Parry LLP

(57) ABSTRACT

A battery cell, a battery, and an electrical device are provided. The battery cell comprises: a case with an opening; an electrode assembly accommodated within the case; and an end cover closing the opening, wherein the end cover is in sealed connection with the case through a first connection area and a second connection area, the strength of the first connection area is less than the strength of the second connection area, and the first connection area is configured to be actuated to release an internal pressure of the battery cell when the internal pressure exceeds a threshold. The battery cell, battery, and electrical device provided in the present application are capable of reducing the manufacturing cost of battery cells while ensuring the safety of batteries, and further reducing the assembly processes of the battery cells.

16 Claims, 6 Drawing Sheets

(51) Int. Cl.
*H01M 50/169* (2021.01)
*H01M 50/183* (2021.01)

(56) References Cited

FOREIGN PATENT DOCUMENTS

| | | | |
|---|---|---|---|
| CN | 202395051 | U | 8/2012 |
| JP | H09259842 | A | 10/1997 |
| JP | 2001043845 | A | 2/2001 |
| JP | 2001155698 | A | 6/2001 |
| JP | 2003017029 | A | 1/2003 |
| JP | 2014002882 | A | 1/2014 |

OTHER PUBLICATIONS

Written Opinion of International Search Authority for International Application PCT/CN2021/128005, mailed May 27, 2022.
International Search Report for International Application PCT/CN2022/123367, mailed Dec. 28, 2022.
Written Opinion of International Search Authority for International Application PCT/CN2022/123667, mailed Dec. 28, 2022.
Extended European search report for EP application No. 22885593.8, dated Jul. 1, 2024.

BATTERY CELL, BATTERY, AND ELECTRICAL DEVICE

CROSS-REFERENCE TO RELATED APPLICATIONS

This application is a continuation of International Patent Application No. PCT/CN2022/123367, filed on Sep. 30, 2022, which claims priority to International Patent Application No. PCT/CN2021/128005, filed on Nov. 1, 2021. The aforementioned patent applications are incorporated herein by reference in their entirety.

TECHNICAL FIELD

The present application relates to the technical field of batteries, and in particular, to a battery cell, a battery and an electrical device.

BACKGROUND

Batteries are main power source of electric vehicles at present, but with an increase in the number of electric vehicles, multiple fire accidents caused by thermal runaway of batteries have occurred, seriously threatening the safety of users' lives and property.

When an abnormality occurs in a battery cell, heat and gas are rapidly generated inside the battery cell, resulting in an increase of internal pressure in the battery cell, it is necessary to discharge the internal pressure in time so as to avoid explosion of the battery cell and greater harm caused thereby. Therefore, how to ensure the safety of battery cells is an urgent problem to be solved in the battery technologies.

SUMMARY

The present application provides a battery cell, a battery, and an electrical device, which is capable of reducing the cost of manufacturing battery cells while ensuring the safety of batteries, and also capable of further reducing the assembly processes of the battery cells.

In a first aspect, a battery cell is provided, including a case with an opening; an electrode assembly accommodated within the case; and an end cover closing the opening, where the end cover is in sealed connection with the case through a first connection area and a second connection area, the strength of the first connection area is less than the strength of the second connection area, and the first connection area is configured to be actuated to release an internal pressure of the battery cell when the internal pressure exceeds a threshold.

It should be understood that the first connection area in the present application is an area with a relatively weak sealing thickness, and the second connection area is an area connected with a normal thickness.

In the foregoing technical solution, when the internal pressure of the battery cell exceeding a threshold, due to the weak sealing, the first connection area between the end cover and the case will burst to release pressure when the internal pressure of the battery cell reaches a certain threshold so as to ensure safety of the battery. This solution may take the place of the existing explosion-proof valve technologies to reduce the manufacturing cost of battery cells, and further reduce the space occupied by battery cells and assembly processes.

In some embodiments, the end cover and the case are connected by welding, and a weld penetration of the first connection area is less than a weld penetration of the second connection area.

In the foregoing technical solution, the strength of the weld seam is positive correlated with the weld penetration, and the deeper the weld penetration, the higher the strength of the weld seam. When the end cover of the battery cell is connected with the case in a welding manner, the weld penetration of the first connection area is less than the weld penetration of the second connection area, therefor, the strength of the first connection area is less than the strength of the second connection area, which enables the first connection area to burst as a weak sealing area when the internal pressure of the battery cell exceeds a certain threshold so as to release pressure.

In some embodiments, the weld penetration of the first connection area is not greater than two-thirds of the weld penetration of the second connection area.

In the foregoing technical solution, the weld penetration of the first connection area is less than or equal to two-thirds of the weld penetration of the second connection area, so that the first connection area is easy to burst when the internal pressure of the battery cell exceeds a certain threshold so as to relieve pressure in the battery cell in time. If the weld penetration of the first connection area is greater than two-thirds of the weld penetration of the second connection area, the strength of the first connection area is relatively high, so it is not easy to burst when the internal pressure of the battery cell exceeds a certain threshold, and the pressure relief speed may be reduced.

In some embodiments, the weld penetration of the first connection area is $H_1$, which satisfies: 0.1 mm$\leq H_1 \leq$0.4 mm; and/or the weld penetration of the second connection area is $H_2$, which satisfies: 0.6 mm$\leq H_2 \leq$0.9 mm.

In the foregoing technical solution, the weld penetration of the first connection area is between 0.1 mm and 0.4 mm, so that the strength of the first connection area is between 0.7 MPa and 1.1 Mpa, therefore the first connection area is easy to burst when the internal pressure of the battery cell exceeds a certain threshold. The weld penetration of the second connection area is between 0.6 mm and 0.9 mm, so that the strength of the second connection area is between 1.5 Mpa and 3 MPa, so as to achieve a fixed connection between the end cover and the case. In addition, there is a difference of 0.4 MPa between the maximum strength of the first connection area and the minimum strength of the second connection area, so that the second connection area is not easy to be opened under the action of the internal pressure in the battery cell, thereby reducing the risk of blowing off the end cover by the internal pressure in the battery cell, which is beneficial to improve the safety of the battery.

In some embodiments, the connection area connecting the end cover with the case extends along a rectangular trajectory, the connection area includes a long side and a short side, where the length of the long side is greater than the length of the short side.

In the foregoing technical solution, the end cover is in a rectangular shape, after welding with the case along the edge of the end cover, the formed connection area extends along a rectangular trajectory, which is suitable for batteries with square cases.

In some embodiments, the length of the long side is $L_1$, which satisfies: $L_1 \geq 50$ mm; the first connection area is arranged on the long side, and the length of the first connection area is $L_2$, which satisfies: $L_1/3 \leq L_2 \leq L_1/2$; and/or the first connection area is arranged on the short side of the connection area, and the length of the short side is $L_3$, satisfying: $L_3/2 \leq L_2 \leq 3L_3/4$.

In the foregoing technical solution, generally speaking, a ratio of the long side to the short side of the connection area is within a preset range, and if the long side of the connection area is increased, the short side thereof is increased accordingly. When the length of the long side is greater than or equal to 50 mm, the lengths of the long side and the short side are both large. The first connection area may be arranged on the long side, alternatively, the first connection area may be arranged on the short side. When the first connection area is arranged on the long side, the length of the first connection area is ⅓-½ of the size of the long side, so that under the premise of satisfying the connection strength between the end cover and the case, the first connection area can be relatively long. If $L_2 < L_1/3$, the length of the first connection area is too short, so the opening formed when the first connection area bursts is small, which is not conducive to rapid pressure relief. If $L_2 > L_1/2$, the length of the first connection area is too long, so the connection strength between the end cover and the case is low. When the first connection area is arranged on the short side, because the short side is close to the corner (an intersection position of the short side and the long side), it can be strengthened by the corner (the strength at the corner is large), and the length of the first connection area can be set larger. The length of the first connection area being ½-¾ of the size of the short side, so that under the premise of satisfying the connection strength between the end cover and the case, the first connection area can be relatively long. If $L_2 < L_3/2$, the length of the first connection area is too short, so the opening formed when the first connection area bursts is small, which is not conducive to rapid pressure relief. If $L_2 > 3L_3/4$, the length of the first connection area is too long, so the connection strength between the end cover and the case is low.

In some embodiments, the length of the long side is $L_1$, which satisfies: $L_1 < 50$ mm; and the first connection area is arranged on the long side.

In the foregoing technical solution, when the length of the long side is less than 50 mm, the length of the short side is too short, so it is not appropriate to arrange the first connection area on the short side alone (at this time, if the first connection area is arranged on the short side, the first connection area is not easy to burst, and even it bursts, the formed opening is small, which is not conducive to rapid pressure relief). At this time, the first connection area is arranged on the long side.

In some embodiments, the length of the long side is $L_1$, which satisfies: $L_1 < 50$ mm; the first connection area includes a first segment, a second segment, and a third segment that are sequentially connected, where the first segment and the third segment are respectively located on two opposite long sides, and the second segment is located on a short side of the connection area.

In the foregoing technical solution, when the length of the long side is less than 50 mm, the first connection area may completely occupy a short side, and simultaneously occupy a part of each of the two long sides. The first connection area may form a U-shaped structure. In this way, the first connection area is easy to burst when the internal pressure of the battery cell exceeds a certain threshold, and the opening after burst is large, which is conducive to rapid pressure relief.

In some embodiments, the connection area connecting the end cover with the case extends along a circular trajectory.

In the foregoing technical solution, the end cover is in a circular shape, and after welding with the case along the edge of the end cover, the formed connection area extends along a circular trajectory, which is suitable for cylindrical batteries.

In some embodiments, along the circumferential direction of the end cover, the length of the first connection area is $L_2$, and the circumference of the connection area connecting the end cover with the case is $L_4$, satisfying: $0.2L_4 \leq L_2 \leq 0.35L_4$.

In the foregoing technical solution, the length of the first connection area is 0.2-0.35 of the circumference of the connection area, so that under the premise of satisfying the connection strength between the end cover and the case, the first connection area can be relatively long. If $L_2 < 0.2L_4$, the length of the first connection area is relatively short, so the opening formed when the first connection area bursts is relatively small, which is not conducive to rapid pressure relief. If $L_2 > 0.35L_4$, the length of the first connection area is relatively long, so the connection strength between the end cover and the case is relatively low.

In some embodiments, along the circumferential direction of the end cover, there is a third connection area between the first connection area and the second connection area, and the strength of the third connection area gradually decreases from a connection position between the third connection area and the second connection area to a connection position between the third connection area and the first connection area, and the minimum strength of the third connection area is not less than the strength of the first connection area, and the maximum strength of the third connection area is not greater than the strength of the second connection area.

In the foregoing technical solution, the third connection area is a transition area, which is capable of achieving a transition from the first connection area to the second connection area. In this way, a welding device does not need to be stopped during the welding process of the case and the end cover, instead, the welding parameters can be adjusted during welding so as to improve the welding efficiency. In addition, by providing the third connection area as a transition area, stress concentration can also be reduced.

In some embodiments, the end cover and the case are connected by welding, the weld penetration of the third connection area gradually decreases from a connection position between the third connection area and the second connection area to a connection position between the third connection area and the first connection area, a minimum weld penetration of the third connection area is not less than the weld penetration of the first connection area, and a maximum weld penetration of the third connection area is not greater than the weld penetration of the second connection area.

In the foregoing technical solution, since the strength of the weld seam is positive correlated with the weld penetration, and the deeper the weld penetration, the higher the strength of the weld seam. The weld penetration of the third connection area changes gradually to facilitate the transition from the first connection area to the second connection area.

In some embodiments, along the circumferential direction of the end cover, a circumference of the connection area connecting the case with the end cover is $L_4$, and the length of the third connection area is $L_5$, satisfying: $L_5 \leq 0.1L_4$.

In the foregoing technical solution, the length of the third connection area being less than or equal to 0.1 times the circumference of the connection area, so that the lengths of the first connection area and the second connection area are relatively long. If $L_5 > 0.1L_4$, the length of the third connection area is too long. Correspondingly, lengths of the first connection area and the second connection area may be shortened, which may affect the size of the opening after the first connection area bursts or affect the connection strength between the end cover and the case.

In some embodiments, the battery cell includes a plurality of first connection areas, and the plurality of first connection areas are arranged at intervals along the circumferential direction of the end cover.

In the foregoing technical solution, by providing a plurality of first connection areas, when an internal pressure of a battery cell reaches a certain threshold, all the plurality of first connection areas can burst to relieve pressure, so as to improve pressure relief speed, which is conducive to improve the safety of the battery.

In some embodiments, the battery cell includes two first connection areas, and the two first connection areas are oppositely arranged.

In the foregoing technical solution, the two first connection areas being oppositely arranged, so that the two first connection areas are not likely to interference with each other, and are capable of relieving pressure independently.

In a second aspect, an embodiment of the present application further provides a battery, including the above-mentioned battery cell.

In a third aspect, an embodiment of the present application further provides an electrical device, including the above-mentioned battery, where the battery is used to provide electric energy for the electrical device.

BRIEF DESCRIPTION OF DRAWINGS

In order to describe the technical solutions in the embodiments of the application more clearly, the accompanying drawings required for describing the embodiments are briefly described below. Obviously, the accompanying drawings in the following description show merely some embodiments of the present disclosure, and a person of ordinary skill in the art would also be able to derive other accompanying drawings from these accompanying drawings without creative efforts.

REFERENCE NUMERALS

Figures 1, 2, 3:
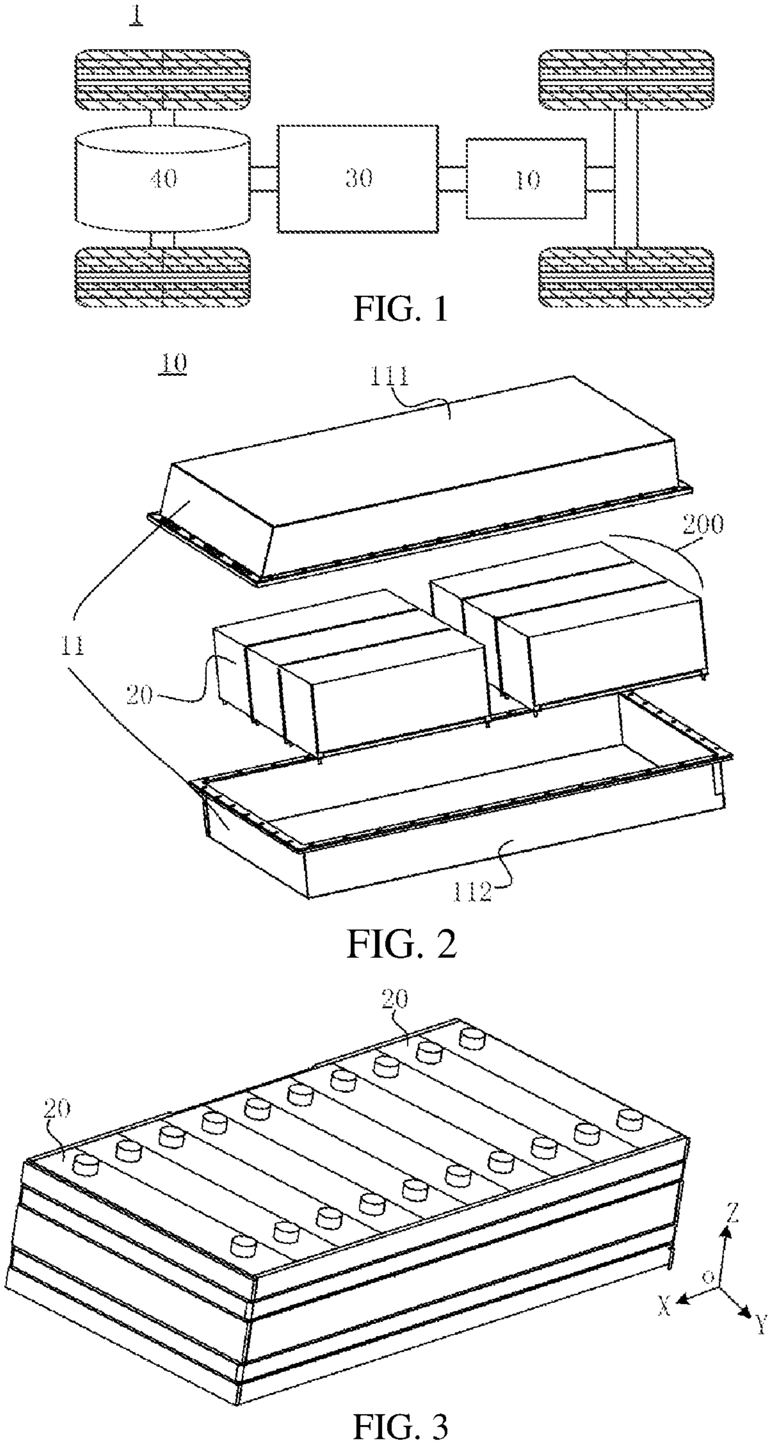
FIG. 1 is a schematic structural diagram of a vehicle disclosed in an embodiment of the present application.
FIG. 2 is an exploded structural view of a battery disclosed in an embodiment of the present application.
FIG. 3 is a schematic structural diagram of a battery module disclosed in an embodiment of the present application.

1—vehicle;
10—battery;
11—box body;
111—first part;
112—second part;
131—electrode terminal;
200—battery module;
210—case;
220—electrode assembly;
230—end cover;
240—connection area;
241—first connection area;
2411—first segment;
2412—second segment;
2413—third segment;
242—second connection area;
243—long side;
244—short side;
245—third connection area;
20—battery cell;
30—controller;
40—motor.

DETAILED DESCRIPTION

The implementations of the present application are further described in detail below with reference to the drawings and embodiments. The following detailed description of the embodiments and the drawings are used to illustrate the principles of the present application by way of example, but should not be used to limit the scope of the present application, that is, the present application is not limited to the described embodiments.

In the description of the present application, it should be noted that, unless otherwise stated, "plurality of" means two or more; the orientation or positional relationships indicated by the terms "upper", "lower", "left", "right", "inner" and "outer" are only for facilitating the description of the present application and simplifying the description, rather than indicating or implying that the apparatus or element referred to must have a particular orientation or be constructed and operated in a particular orientation, and therefore will not be interpreted as limiting the present application. In addition, the terms "first", "second", "third" and so on are used for descriptive purposes only, and cannot be understood to indicate or imply relative importance. "Perpendicular" is not perpendicular in the strict sense, but within the allowable range of error. "Parallel" is not parallel in the strict sense, but within the allowable range of error.

The orientation words appearing in the following description are all the directions shown in the figures, and are not intended to limit the specific structure of the application. In the description of the present application, it should be further noted that unless otherwise prescribed and defined clearly, terms "mounting", "communicating" and "connecting" should be understood in a broad sense, which for example can be a fixed connection and can also be a detachable connection or an integral connection; or can be a direct connection and can also be a connection through an intermediary. For those of ordinary skill in the art, the specific meanings of the above terms in the present application may be understood according to specific circumstances.

In the present application, the term "and/or" is only an association relationship for describing associated objects, indicating that three relationships may exist. For example, A and/or B may represent three situations: A exists alone, both A and B exist, and B exists alone. In addition, the character "/" in the present application generally means that the associated objects before and after it are in an "or" relationship.

Unless otherwise defined, all technical and scientific terms used herein have the same meaning as those normally understood by a person of skill in the art of this application. The terms used herein are for the purpose of describing specific embodiments and are not intended to limit this application. The terms "comprise" and "have" and any variations thereof in the description, claims and said drawings of this application are intended to cover a non-exclusive inclusion. The terms such as "first" and "second" used in the specification, claims, and brief description of drawings herein are intended to distinguish between different items, but are not intended to describe a specific sequence or order of precedence.

The "embodiment" referred herein means at least one embodiment that can be included in the present application with reference to the specific characteristics, structures or features described in the embodiment. The appearance of this phrase in various places in the specification does not necessarily refer to the same embodiment, nor is it a separate or alternative embodiment that is mutually exclusive with other embodiments. It is understood explicitly and implicitly by those skilled in the art that the embodiments described in the present application can be combined with other embodiments.

In the present application, the battery cell may comprise a lithium-ion secondary battery, a lithium-ion primary battery, a lithium-sulfur battery, a sodium-lithium-ion battery, a sodium-ion battery, a magnesium-ion battery, or the like, without limitation in the examples of the present application. The battery cell may be in a cylindrical, flat, rectangular, or other regular or irregular shape, which is also not limited in the embodiments of the present application. Generally, the battery cells are divided into three types according to packaging manners: cylindrical battery cells, square battery cells and pouch battery cells, which are not limited by the embodiments of the application.

The battery mentioned in the embodiments of the application refers to a single physical module which includes one or a plurality of battery cells and therefore provides a higher voltage and capacity. For example, the battery mentioned in the present application may include a battery module, a battery pack, or the like. The battery generally comprises a box body for encapsulating one or more battery cells. The box body can prevent liquids or other foreign matters from affecting charging or discharging of the battery cells.

The battery cell includes an electrode assembly and electrolyte solution. The electrode assembly is composed of a positive electrode sheet, a negative electrode sheet and a separator. The battery cell works mainly relying on the movement of metal ions between the positive electrode sheet and the negative electrode sheet. The positive electrode sheet comprises a positive electrode current collector and a positive electrode active material layer, wherein the positive electrode active material layer is coated on a surface of the positive electrode current collector, the part of the positive electrode current collector not coated with the positive electrode active material layer protrudes from the part of the positive electrode current collector already coated with the positive electrode active material layer, and the part of the positive electrode current collector not coated with the positive electrode active material layer serves as a positive electrode tab. Taking a lithium-ion battery as an example, the material of the positive current collector may be aluminum, and the positive active material may be lithium cobalt oxide, lithium iron phosphate, ternary lithium, lithium manganate, or the like. The negative electrode sheet comprises a negative current collector and a negative active material layer. The negative active material layer is coated on the surface of the negative current collector, and the negative current collector uncoated with negative active material layer protrudes from the negative current collector coated with negative active material layer, while the negative current collector uncoated with the negative active material layer is used as a negative electrode tab. The material of the negative electrode current collector may be copper, and the negative electrode active material may be carbon, silicon, or the like. In order to ensure that no fusing occurs when a large current passes, there are a plurality of positive electrode tabs which are stacked together, and there are a plurality of negative electrode tabs which are stacked together. A material of the separator may be polypropylene (PP) or polyethylene (PE). In addition, the electrode assembly may be of a wound structure or a laminated structure, which is not limited in the embodiments of the present application.

Many design factors, such as energy density, cycle life, discharge capacity, charge-discharge rate and other performance parameters, should be considered in the development of the battery technology. In addition, the safety of the battery also needs to be taken into account.

For a battery, a main safety hazard comes from a charging process and a discharging process, and in order to improve safety performance of the battery, a pressure relief mechanism is generally provided for a battery cell. The pressure relief mechanism refers to an element or component that is actuated to relieve the internal pressure or temperature when the internal pressure or temperature of the battery cell reaches a predetermined threshold. The predetermined threshold may be adjusted according to different design requirements. The predetermined threshold may depend on the material of one or a plurality of the positive electrode sheet, the negative electrode sheet, the electrolyte solution, and the separator in battery cell. The pressure relief mechanism may employ, for example, pressure-sensitive or temperature-sensitive elements or components, i.e., when the internal pressure or temperature of the battery cell reaches a predetermined threshold, the pressure relief mechanism is actuated so as to form a channel for relieving the internal pressure or temperature.

The "actuate" mentioned in the present application means that the pressure relief mechanism performs an action, so that the internal pressure and temperature of battery cell can be relieved. Actions produced by the pressure relief mechanism may include, but are not limited to, at least a part of the pressure relief mechanism being broken, torn or melted, or the like. After the pressure relief mechanism is actuated, high temperature and high pressure substances inside the battery cell may be discharged outward from the pressure relief mechanism as emissions. In this way, the pressure of the battery cell can be relieved under controllable pressure or temperature, so as to prevent potential more serious accidents.

The emissions from the battery cell mentioned in the present application include, but are not limited to, the electrolyte solution, dissolved or split positive and negative electrode sheets, fragments of the separator, high temperature and high pressure gas generated by reaction, flames, and the like.

A pressure relief mechanism on the battery cell has an important impact on the safety of the battery. For example, when a battery cell is short-circuited, over-charged, or the like, it may cause thermal runaway inside the battery cell, resulting in a sudden rise in pressure or temperature. In this situation, the internal pressure and heat can be released outward by actuating the pressure relief mechanism, thereby preventing explosion and fire of the battery cell.

Currently, an explosion-proof valve is usually arranged on the end cover of a battery cell as a pressure relief mechanism, so that when the internal pressure of the battery cell reaches a certain value, the explosion-proof valve is broken through to release pressure. However, the explosion-proof valve has high requirements on the welding process, which increases the production cost of the battery, and further requires more installation space and assembly process.

For the foregoing problem, an embodiment of the present application provides a battery cell. A weak sealing area is arranged at a joint between the case and the end cover of a battery cell as a pressure relief mechanism, which is used to be actuated to relieve the pressure when an internal pressure or temperature of the battery cell reaches a threshold; wherein sealing thickness of the weak sealing area is smaller than the normal sealing area. In this way, when the internal pressure or temperature of a battery cell reaches a threshold, the weak sealing area is first broken though to release the pressure. In addition, this solution can also reduce the manufacturing cost of the battery cells and reduce the occupied space and assembly process.

The technical solution described in the embodiments of the present application is applicable to various electrical device using the batteries.

The electrical device may be a vehicle, a mobile phone, a portable device, a laptop computer, a ship, a spacecraft, an electric toy, an electric tool, and the like. The vehicle may be a fuel vehicle, a gas vehicle or a new energy vehicle. The new energy vehicle may be an all-electric vehicle, a hybrid electric vehicle, an extended-range vehicle, or the like. The spacecraft includes airplanes, rockets, space shuttles, spaceships, and the like. The electric toy includes fixed or mobile electric toys, such as game consoles, electric car toys, electric ship toys and electric aircraft toys. The electric tool includes metal cutting electric tools, grinding electric tools, assembly electric tools and railway electric tools, such as electric drills, electric grinders, electric wrenches, electric screwdrivers, electric hammers, impact drills, concrete vibrators and electric planers. The embodiments of the present application do not specifically limit the above electrical devices.

In the following embodiments, for the convenience of description, the electrical device being a vehicle is taken as an example for description.

For example, as shown in FIG. 1, a schematic structural diagram of vehicle 1 according to an example of the application is shown. Vehicle 1 may be a fuel vehicle, a gas vehicle, or a new energy vehicle, and the new energy vehicle may be an all-electric vehicle, a hybrid electric vehicle, an extended range electric vehicle, or the like. A motor 40, a controller 30 and a battery 10 may be provided inside the vehicle 1, and the controller 30 is configured to control the battery 10 to supply power to the motor 40. For example, the battery 10 may be arranged at the bottom or the head or the tail of the vehicle 1. The battery 10 may be configured to supply power to the vehicle 1, for example, the battery 10 may be used as an operating power source of the vehicle 1, which is used for a circuit system of the vehicle 1, for example, for operation power requirements of the vehicle 1 during starting, navigation and running. In another embodiment of the present application, the battery 10 can be used not only as the operating power source of the vehicle 1, but also as the driving power source of the vehicle 1 in place of or partially in place of fuel or natural gas to provide driving power for the vehicle 1.

In order to meet different power requirements, battery 10 may include a plurality of battery cells 20, where the plurality of battery cells 20 may be in series connection, in parallel connection, or in parallel-series connection, the parallel-series connection refers to mixing of the series connection and the parallel connection. The battery 10 may also be referred to as a battery pack. In some embodiments, the plurality of battery cells 20 may be in series, parallel or parallel-series connection to form battery modules 200 first, and then the plurality of battery modules 200 may be in series, parallel or parallel-series connection to form the battery 10. That is to say, the plurality of battery cells 20 may directly form a battery 10, or may form battery modules 200 first, and then the battery modules 200 form a battery 10.

For example, FIG. 2 is a schematic structural diagram of a battery 10 according to an embodiment of the present application. The battery 10 may include at least one battery module 200. The battery module 200 includes a plurality of battery cells 20. The battery 10 may further include a box body 11, the interior of the box body 11 is in a hollow structure, and the plurality of battery cells 20 are accommodated in the box body 11. FIG. 2 shows a possible implementation of the box body 11 according to an embodiment of the present application. As shown in FIG. 2, the box body 11 may comprise two parts, referred to herein as a first part 111 and a second part 112, and the first part 111 and the second part 112 are snap-fitted together. The shapes of the first part 111 and the second part 112 may be determined according to the combined shape of the battery module 200, and at least one of the first part 111 and the second part 112 has an opening. For example, as shown in FIG. 2, both of the first part 111 and the second part 112 may be hollow rectangular parallelepiped and each has only one opening side, the opening of the first part 111 and the opening of the second part 112 are oppositely arranged, and the first part 111 and the second part 112 are snap-fitted with each other to form a box body 11 having a closed chamber.

For another example, unlike that shown in FIG. 2, only one of the first part 111 and the second part 112 may be a hollow rectangular parallelepiped with an opening, and the other is in a plate shape to cover the opening. Take the second part 112 being a hollow rectangular parallelepiped with only one opening side while the first part 111 being in a plate shape as an example, the first part 111 is covered at the opening of the second part 112 to form a box body 11 with a closed chamber, the chamber may be configured to accommodate a plurality of battery cells 20. The plurality of battery cells 20 are combined in parallel connection or series connection or parallel-series connection and are then placed in the box body 11 formed by snap-fitting the first part 111 with the second part 112.

In some embodiments, the battery 10 may further include other structures, which will not be repeated here. For example, the battery 10 may also include a bus component. The bus component is configured to implement electrical connection between the plurality of battery cells 20, such as parallel connection, series connection or parallel-series connection. Specifically, the bus component may implement electrical connection between the battery cells 20 by connecting electrode terminals 131 of the battery cells 20. Further, the bus component may be fixed to electrode terminals 131 of the battery cells 20 through welding. Electric energy of the plurality of battery cells 20 may be further led out through an electrically conductive mechanism penetrating the box body 11.

Depending on different power requirements, the number of battery cells 20 in the battery module 200 may be set to any value. The plurality of battery cells 20 can be connected in series, in parallel or in parallel-series to implement larger capacity or power. Since there may be many battery cells 20 included in each battery 10, the battery cells 20 are arranged in groups for convenience of installation, and each group of battery cells 20 constitutes a battery module 200. The number of the battery cells 20 included in the battery module 200 is not limited and may be set as required. For example, FIG. 3 is an example of a battery module 200. The battery 10 may include a plurality of battery modules 200, these battery modules 200 may be connected in series, in parallel, or in a parallel-series manner. It can be understood that the plurality of battery cells 20 may be assembled directly into the battery 10.

Figure 4:
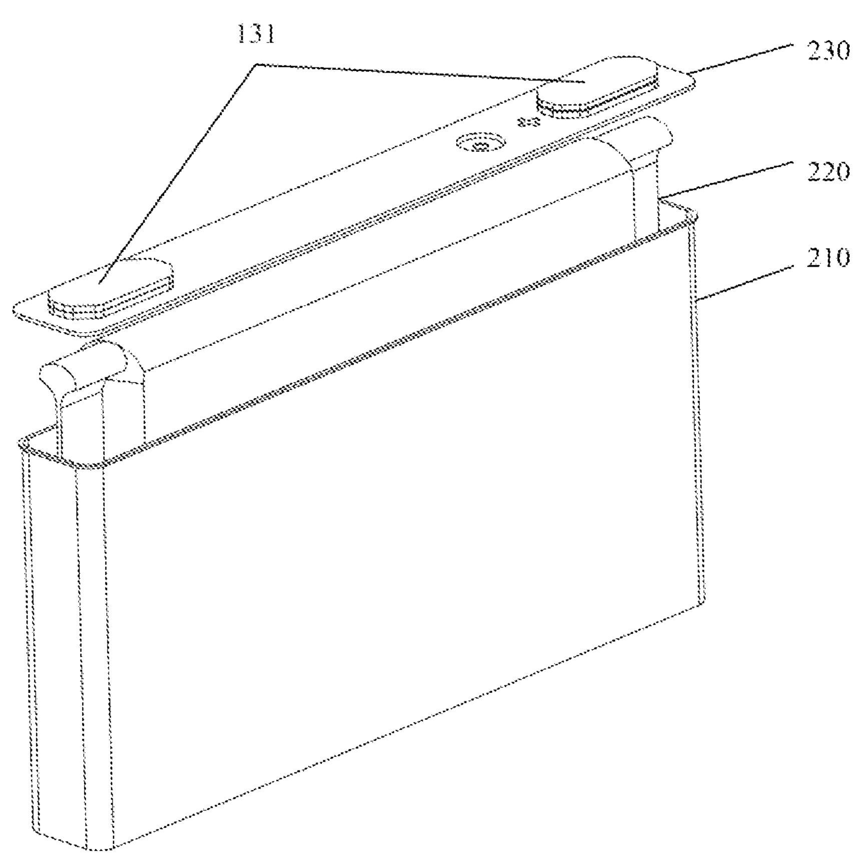
FIG. 4 is an exploded view of a battery cell disclosed in an embodiment of the present application.
Figures 5, 6:
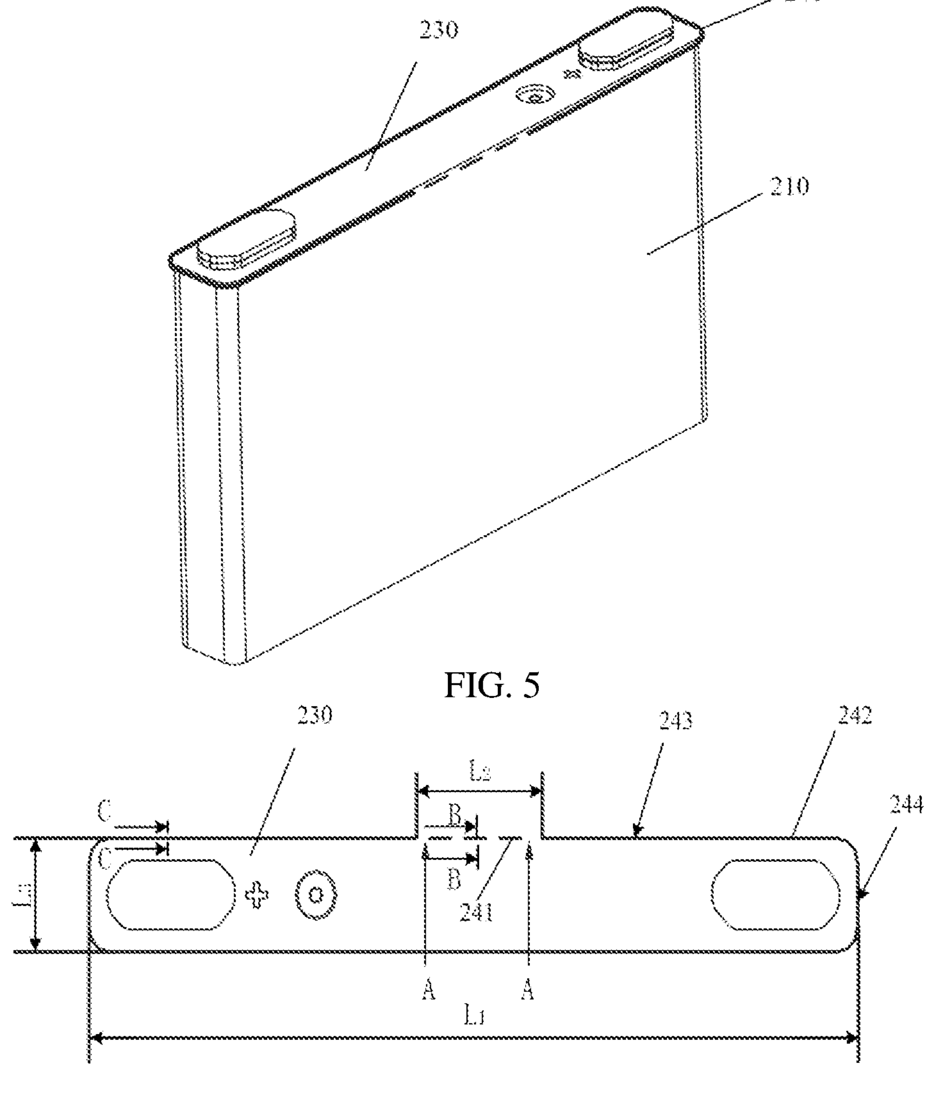
FIG. 5 is a schematic diagram of a battery cell disclosed in an embodiment of the present application.
FIG. 6 is a top view of a battery cell disclosed in an embodiment of the present application.

FIG. 4 is an exploded structural view of a battery cell 20 according to an embodiment of the present application. FIG. 5 is a schematic structural diagram of a battery cell 20 according to an embodiment of the present application. As shown in FIGS. 4 and 5, the battery cell 20 includes a case 210, an electrode assembly 220, and an end cover 230. The electrode assembly 220 is accommodated within the case 210, and the end cover 230 is used to cover the opening of the case 210. The case 210 is a component for accommodating the electrode assembly 220, and the case 210 may be of a hollow structure with an opening formed at one end, alternatively, the case 210 may be of a hollow structure with openings formed at opposite ends. If the case 210 being of a hollow structure with an opening formed at one end, then, one end cover 230 may be provided; if the case 210 being of a hollow structure with openings formed at two opposite ends, then, two end covers 230 may be provided, and the two end covers 230 cover the openings at both ends of the case 210 respectively. The case 210 may be made of various materials, such as copper, iron, aluminum, stainless steel, aluminum alloy, or the like. The case 210 may be of various shapes, such as cylinder, rectangular parallelepiped, or the like. Exemplarily, in FIGS. 4 and 5, the case 210 is in a rectangular parallelepiped structure, and the case 210 is in a hollow structure with an opening formed at one end.

In the battery cell 20, according to actual usage requirements, the electrode assembly 220 in the case 210 may be set to one or more, and as shown in FIG. 4, one independent electrode assembly 220 is arranged in the battery cell 20.

The electrode assembly 220 is a component in which an electrochemical reaction occurs in the battery cell 20. The electrode assembly 220 may be a cylinder, a rectangular parallelepiped, or the like, and if the electrode assembly 220 is in a cylindrical structure, the case 210 may also be in a cylindrical structure, and if the electrode assembly 220 is in a rectangular parallelepiped structure, the case 210 may also be in a rectangular parallelepiped structure.

The end cover 230 is a component that covers the opening of the case 210 to isolate the internal environment of the battery cell 20 from the external environment. The shape of the end cover 230 may be adapted to the shape of the case 210. As shown in FIG. 4, the case 210 is in a rectangular parallelepiped structure, and the end cover 230 is in a rectangular plate-like structure adapted to the case 210. The material of the end cover 230 can also be various, for example, copper, iron, aluminum, steel, aluminum alloy, or the like, and the material of the end cover 230 and the material of the case 210 may be the same or different. The end cover 230 may be provided with functional components such as electrode terminals 131. The electrode terminal 131 may be configured to electrically connect with the electrode assembly 220 for outputting or inputting electric energy from/to the battery cell 20.

The battery cell 20 provided in the embodiment of the present application includes a case 210, an electrode assembly 220, and an end cover 230. The case 210 has an opening, the electrode assembly 220 is accommodated within the case 210, and the end cover 230 closes the opening. The end cover 230 is in sealed connection with the case 210 through the first connection area 241 and the second connection area 242. The strength of the first connection area 241 is less than the strength of the second connection area 242. The first connection area 241 is configured to be actuated to release internal pressure of the battery cell 20 when the internal pressure exceeds a threshold.

FIG. 6 is a top view of a battery cell 20 according to an embodiment of the present application. As shown in FIG. 6, when the end cover 230 closes the opening of the case 210, the end cover 230 being in sealed connection with the case 210 through the connection area 240. The connection area 240 includes a first connection area 241 and a second connection area 242. The first connection area 241 is shown by a dashed line at A-A, and the second connection area 242 is shown by a solid line connected with the dashed line. The quantity of the first connection area 241 may be one, or may be multiple. This is not limited in the present application.

It should be understood that the first connection area 241 includes a sealed connection portion between the end cover 230 and the case 210 located at A-A. For example, when the end cover 230 is directly sealed and connected with the case 210, the first connection area 241 may include part of the end cover 230 and part of the case 210, when the end cover 230 and the case 210 are sealed and connected by using other sealing members, the first connection area 241 also includes part of the sealing members. The second connection area 242 includes a sealed connection portion between the end cover 230 and the case 210. For example, when the end cover 230 is directly sealed and connected with the case 210, the second connection area 242 may include part of the end cover 230 and part of the case 210, and when the end cover 230 and the case 210 are sealed and connected by using other sealing members, the second connection area 242 also includes part of the sealing members.

In the embodiment of the present application, the strength of the first connection area 241 is less than the strength of the second connection area 242, that is, the first connection area 241 is an area where the sealing is relatively weak when the end cover 230 and the case 210 are connected, so as to serve as a pressure relief mechanism configured to be actuated to relieve pressure when the pressure or temperature inside the battery cell 20 reaches a threshold. To be specific, the internal pressure will push off the end cover 230 of the battery cell 20 at the first connection area 241, so as to release the internal pressure, thereby preventing explosion and fire of the battery cell 20.

According to the embodiment of the present application, on one hand, it is possible to release internal pressure of the battery cell 20 without providing an explosion-proof mechanism on the end cover 230 of the battery 10, thereby ensuring the safety of the battery 10. On the other hand, it is also possible to reduce the manufacturing cost of the battery cells 20, reduce the occupied space and assembly processes.

In a specific connection manner, the end cover 230 and the case 210 may be connected by welding and the connection area 240 is formed. Welding, also known as fusing, is a manufacturing process and technology that uses heat, high temperature or high pressure to join metals or other thermoplastic materials such as plastics.

Figures 7, 8, 9:
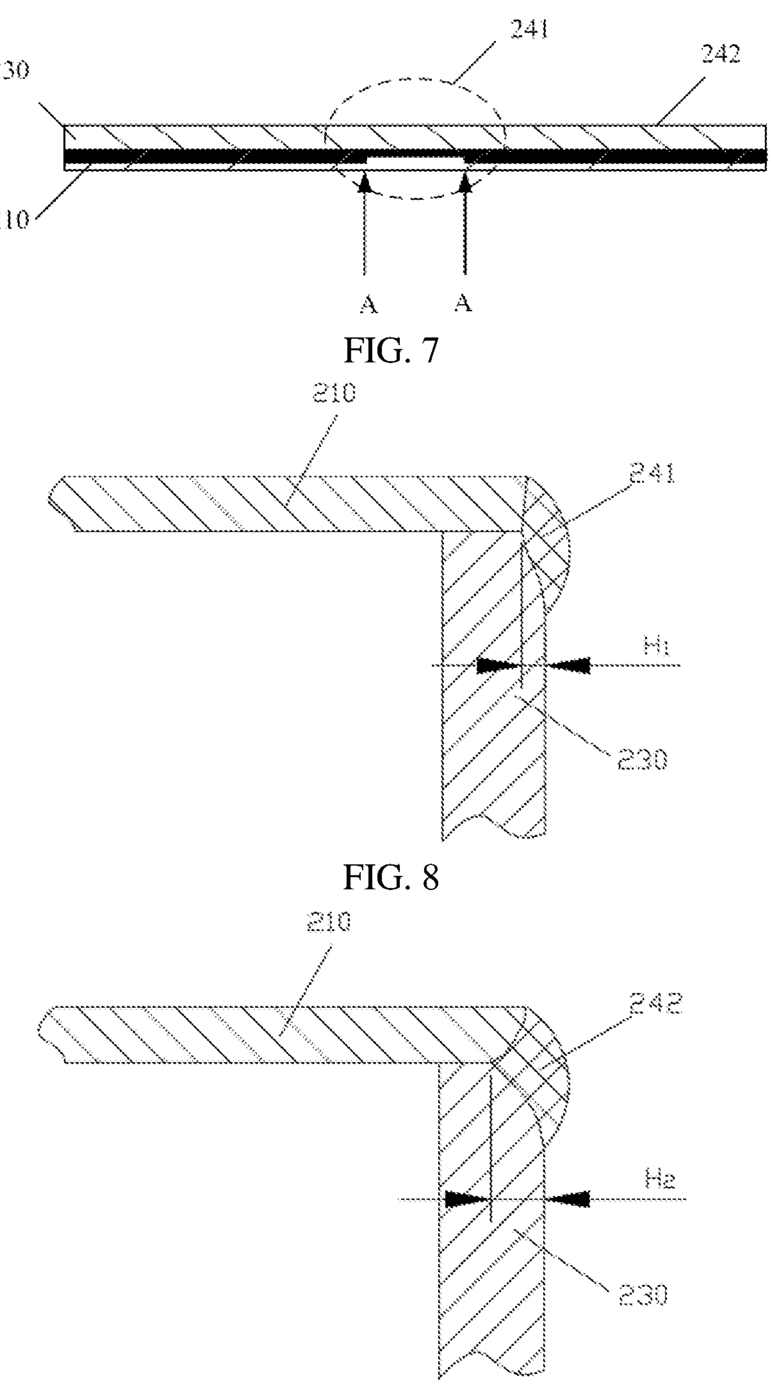
FIG. 7 is a cross-sectional view of part A-A of a battery cell disclosed in an embodiment of the present application.
FIG. 8 is a cross-sectional view of position B-B in FIG. 6.
FIG. 9 is a cross-sectional view of position C-C in FIG. 6.

FIG. 7 is a schematic cross-sectional view of part A-A of a battery cell 20 according to an embodiment of the present application, wherein an end cover 230 of a battery cell 20 is connected with a case 210 by using the foregoing welding method. As shown in FIG. 7, the part filling in black is a welded portion between the end cover 230 and the case 210, where the weld penetration of the first connection area 241 is less than the weld penetration of the second connection area 242, so that the first connection area 241 is more likely to be ruptured by internal pressure than the second connection area 242, thereby releasing pressure from the first connection area 241. It should be understood that the weld penetration refers to the distance from the weldment surface to the deepest position in the melted zone of the butt weld seam between the end cover 230 and the case 210. The strength of the weld seam is positive correlated with the weld penetration, and the deeper the weld penetration, the higher the strength of the weld seam. When the end cover 230 of the battery cell 20 is connected with the case 210 by welding, the weld penetration of the first connection area 241 is less than the weld penetration of the second connection area 242, so the strength of the first connection area 241 is less than the strength of the second connection area 242, so that the first connection area 241 bursts as a weak sealing area when the internal pressure of the battery cell 20 exceeds a certain threshold so as to release pressure.

In a preferred implementation, the weld penetration of the first connection area 241 is not greater than two-thirds of the weld penetration of the second connection area 242.

The weld penetration of the first connection area 241 being less than or equal to two-thirds of the weld penetration of the second connection area 242, so that the first connection area 241 is easy to burst when the internal pressure of the battery cell 20 exceeds a certain threshold so as to relieve pressure in the battery cell 20 in time. If the weld penetration of the first connection area 241 is greater than two-thirds of the weld penetration of the second connection area 242, the strength of the first connection area 241 is relatively high, so it is not easy to burst when the internal pressure of the battery cell 20 exceeds a certain threshold, and the pressure relief speed may be reduced.

Referring to FIGS. 6, 8, and 9, FIG. 8 is a cross-sectional view of position B-B in FIG. 6. FIG. 9 is a cross-sectional view of position C-C in FIG. 6. In some embodiments, the weld penetration of the first connection area 241 is $H_1$, which satisfies: 0.1 mm$\leq H_1 \leq$0.4 mm. And/or the weld penetration of the second connection area 242 is $H_2$, which satisfies: 0.6 mm$\leq H_2 \leq$0.9 mm.

The weld penetration refers to the distance from the weldment surface to the deepest position in the melted zone of the butt weld seam between the end cover 230 and the case 210. In conjunction with FIG. 8, the weld penetration of the first connection area 241 is the distance from a surface of the end cover 230 that faces away from the interior of the battery cell 20 in the thickness direction thereof to a position of the first connection area 241 facing the interior of the end cover 230 that is farthest from the above surface. In conjunction with FIG. 9, the weld penetration of the second connection area 242 is the distance from a surface of the end cover 230 that faces away from the interior of the battery cell 20 in the thickness direction thereof to a position of the second connection area 242 facing the interior of the end cover 230 that is farthest from the above surface.

Since the grains of the material will change before and after welding, after cutting through section B-B, traces of the first connection area 241 can be seen clearly, therefore, the weld penetration of the first connection area 241 can be measured. Similarly, after cutting through section C-C, traces of the second connection area 242 can be seen clearly, therefore, the weld penetration of the second connection area 242 can be measured.

The value of the weld penetration of the first connection area 241 may be: $H_1$=0.1 mm, 0.15 mm, 0.2 mm, 0.25 mm, 0.3 mm, 0.35 mm, 0.4 mm, or the like.

The value of the weld penetration of the second connection area 242 may be: $H_2$=0.6 mm, 0.65 mm, 0.7 mm, 0.75 mm, 0.8 mm, 0.85 mm, 0.9 mm, or the like.

The weld penetration of the first connection area 241 is between 0.1 mm and 0.4 mm, so that the strength of the first connection area 241 is between 0.7 MPa and 1.1 MPa, therefore, the first connection area 241 is easy to burst when the internal pressure of the battery cell 20 exceeds a certain threshold. The weld penetration of the second connection area 242 is between 0.6 mm and 0.9 mm, so that the strength of the second connection area 242 is between 1.5 Mpa and 3 MPa, so as to achieve a fixed connection between the end cover 230 and the case 210. In addition, there is a difference of 0.4 MPa between the maximum strength of the first connection area 241 and the minimum strength of the second connection area 242, so that the second connection area 242 is not easy to be opened under action of the internal pressure of the battery cell 20, thereby reducing the risk of blowing off the end cover 230 by the internal pressure in the battery cell 20, which is conducive to improve the safety of the battery 10.

Referring to FIG. 6 again, in some embodiments, the connection area 240 connecting the end cover 230 with the case 210 extends along a rectangular trajectory. The connection area 240 includes a long side 243 and a short side 244, the length of the long side 243 is greater than the length of the short side 244.

The connection area 240 extends along a rectangular trajectory to form a rectangular frame structure. The longer side in the rectangular frame structure is the long side 243 of the connection area 240, and the shorter side thereof is the short side 244 of the connection area 240.

The end cover 230 is in a rectangular shape, after welding with the case 210 along the edge of the end cover 230, the formed connection area 240 extends along a rectangular trajectory, which is suitable for batteries with square cases.

In some embodiments, the length of the long side 243 is $L_1$, which satisfies: $L_1 \geq 50$ mm. The first connection area 241 is arranged on the long side 243, and the length of the first connection area 241 is $L_2$, which satisfies: $L_1/3 \leq L_2 \leq L_1/2$. And/or the first connection area 241 is arranged on the short side 244 of the connection area 240, the length of the short side 244 is $L_3$, satisfying: $L_3/2 \leq L_2 \leq 3L_3/4$.

Generally, circular arc transition is used at the corner between the case 210 and the end cover 230 (an intersection position of the short side 244 and the long side 243), which can reduce stress concentration on one hand, and on the other hand, can prevent operators from being cut so as to increase safety. For ease of measurement, the distance between two short sides 244 oppositely arranged may be taken as the length of the long side 243. Accordingly, the distance between two long sides 243 oppositely arranged may be taken as the length of the short side 244.

Generally, a ratio of the long side 243 and the short side 244 of the connection area 240 is within a preset range, if the long side 243 of the connection area 240 increases, the short side 244 thereof increases accordingly. When the length of the long side 243 is greater than or equal to 50 mm, the lengths of the long side 243 and the short side 244 are both large. The first connection area 241 may be arranged on the long side 243, alternatively, the first connection area 241 may be arranged on the short side 244.

Figure 10:
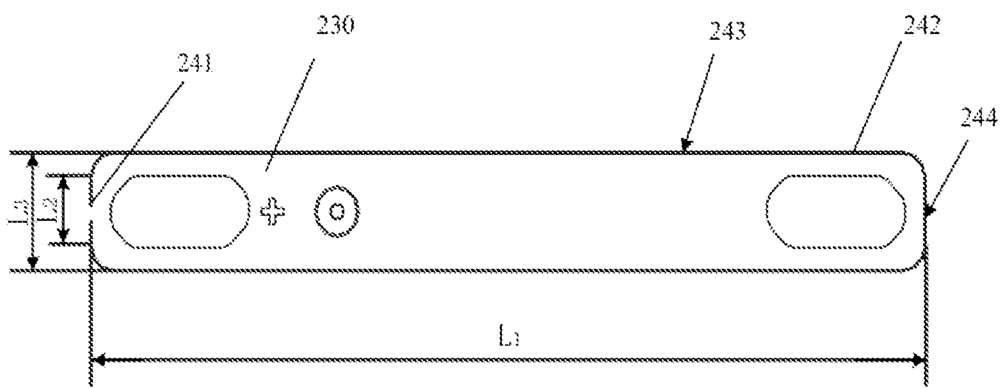
FIG. 10 is a top view of another battery cell disclosed in an embodiment of the present application.

Please refer to FIG. 6, FIG. 6 shows a situation in which the first connection area 241 is arranged on the long side 243. Please refer to FIG. 10, FIG. 10 is a top view of another battery cell 20 according to an embodiment of the present application. FIG. 10 shows a situation in which the first connection area 241 is arranged on the short side 244. Certainly, when $L_1 \geq 50$ mm, the first connection area 241 may also be arranged on the long side 243 and the short side 244 at the same time.

When the first connection area 241 is arranged on the long side 243, a length value of the first connection area 241 may be: $L_2=L_1/3$, $7L_1/18$, $4L_1/9$, $L_1/2$, or the like.

When the first connection area 241 is arranged on the short side 244, a length value of the first connection area 241 may be: $L_2=L_3/2$, $9L_3/16$, $5L_3/8$, $11L_3/16$, $3L_3/4$, or the like.

When the first connection area 241 is arranged on the long side 243, the length of the first connection area 241 is ⅓-½ of the size of the long side 243, so that under the premise of satisfying the connection strength between the end cover 230 and the case 210, the first connection area 241 can be relatively long. If $L_2<L_1/3$, the length of the first connection area 241 is too short, so the opening formed when the first connection area 241 bursts is small, which is not conducive to rapid pressure relief. If $L_2>L_1/2$, the length of the first connection area 241 is too long, so the connection strength between the end cover 230 and the case 210 is low. When the first connection area 241 is arranged on the short side 244, because the short side 244 is close to the corner (an intersection position of the short side 244 and the long side 243), it can be strengthened by the corner (the strength at the corner is large), so the length of the first connection area 241 can be set larger. The length of the first connection area 241 being ½-¾ of the size of the short side 244, so that under the premise of satisfying the connection strength between the end cover 230 and the case 210, the first connection area 241 can be relatively long. If $L_2<L_3/2$, the length of the first connection area 241 is too short, so the opening formed when the first connection area 241 bursts is small, which is not conducive to rapid pressure relief. If $L_2>3L_3/4$, the length of the first connection area 241 is too long, so the connection strength between the end cover 230 and the case 210 is low.

In some embodiments, the length of the long side 243 is $L_1$, which satisfies: $L_1<50$ mm The first connection area 241 is disposed on the long side 243.

When the length of the long side 243 is less than 50 mm, the length of the short side 244 is too short, and it is not appropriate to arrange the first connection area 241 on the short side 244 alone (at this time, if the first connection area 241 is arranged on the short side, the first connection area 241 is not easy to burst, and even it bursts, the formed opening is small, which is not conducive to rapid pressure relief). At this time, the first connection area 241 is arranged on the long side 243.

Figure 11:
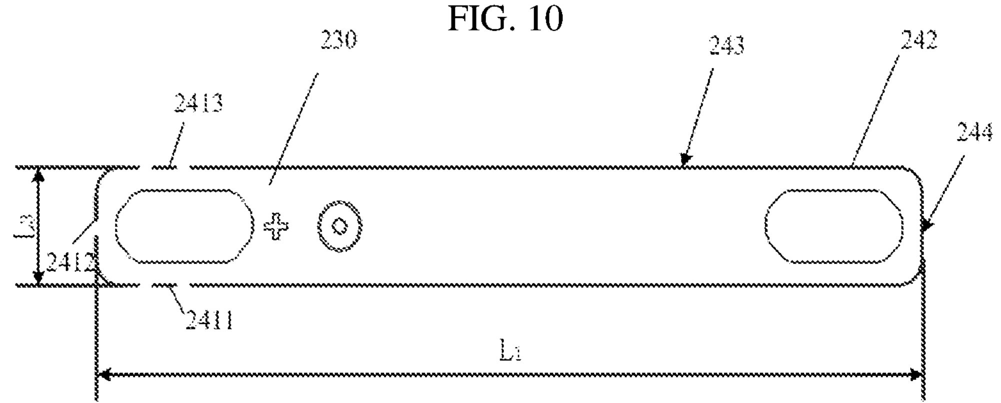
FIG. 11 is a top view of still another battery cell disclosed in an embodiment of the present application.

Please refer to FIG. 11, FIG. 11 is a top view of still another battery cell 20 according to an embodiment of the present application. In still another embodiment, the length of the long side 243 is $L_1$, which satisfies: $L_1<50$ mm. The first connection area 241 includes a first section 2411, a second section 2412 and a third segment 2413 that are sequentially connected, the first segment 2411 and the third segment 2413 are respectively located on two opposite long sides 243, and the second segment 2412 is located on a short side 244 of the connection area 240.

The first segment 2411 is a part of the first connection area 241 that is arranged on one long side 243, the third segment 2413 is a part of the first connection area 241 that is arranged on the other long side 243, and the second segment 2412 is part of the first connection area 241 that is arranged on a short side 244, the first segment 2411 and the third segment 2413 are oppositely arranged, and two ends of the second segment 2412 are respectively connected with the first segment 2411 and the third segment 2413. The second segment 2412 completely occupies a short side 244.

The lengths of the first segment 2411 and the third segment 2413 may be the same or different. In other words, the length of the first segment 2411 may be greater than the length of the third segment 2413, or may be equal to the length of the third segment 2413, also may be less than the length of the third segment 2413.

When the length of the long side 243 is less than 50 mm, the first connection area 241 may completely occupy one short side 244 and occupy a part of each of the two long sides 243 at the same time. The first connection area 241 may form a U-shaped structure. In this way, the first connection area 241 is easy to burst when the internal pressure of the battery cell 20 exceeds a certain threshold, and the opening after burst is large, which is conducive to rapid pressure relief.

Figure 12:
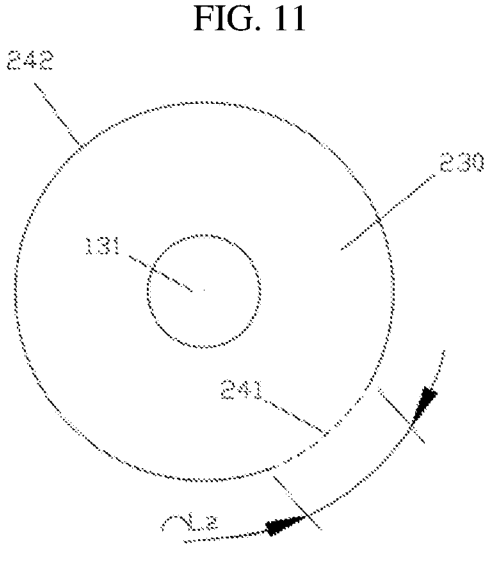
FIG. 12 is a top view of a battery cell disclosed in an embodiment of the present application in which the connection area is extending along a circular trajectory.

Referring to FIG. 12, FIG. 12 is a top view of a battery cell 20 in which the connection area 240 is extending along a circular trajectory according to an embodiment of the present application. In some embodiments, the connection area 240 connecting the end cover 230 with the case 210 extends along a circular trajectory.

The connection area 240 extends along a circular trajectory and forms a circular ring structure.

The end cover 230 is in a circular shape, and after welding with the case 210 along the edge of the end cover 230, the formed connection area 240 extends along a circular trajectory, which is suitable for cylindrical batteries.

Please refer to FIG. 12, in some embodiments, along a circumferential direction of the end cover 230, the length of the first connection area 241 is $L_2$, and the circumference of the connection area 240 connecting the end cover 230 with the case 210 is $L_4$, satisfying: $0.2L_4 \leq L_2 \leq 0.35L_4$.

The first connection area 241 is in a circular arc shape, and the length of the first connection area 241 is the arc length of the circular arc.

The length value of the first connection area 241 may be: $L_2=0.2L_4$, $0.22L_4$, $0.24L_4$, $0.26L_4$, $0.28L_4$, $0.3L_4$, $0.32L_4$, $0.34L_4$, $0.35L_4$, and the like.

The length of the first connection area 241 is 0.2-0.35 of the circumference of the connection area 240, so that under the premise of satisfying the connection strength between the end cover 230 and the case 210, the first connection area 241 can be relatively long. If $L_2<0.2L_4$, the length of the first connection area 241 is too short, so the opening formed when the first connection area 241 bursts is small, which is not conducive to rapid pressure relief. If $L_2>0.35L_4$, the length of the first connection area 241 is too long, so the connection strength between the end cover 230 and the case 210 is low.

Figure 13:
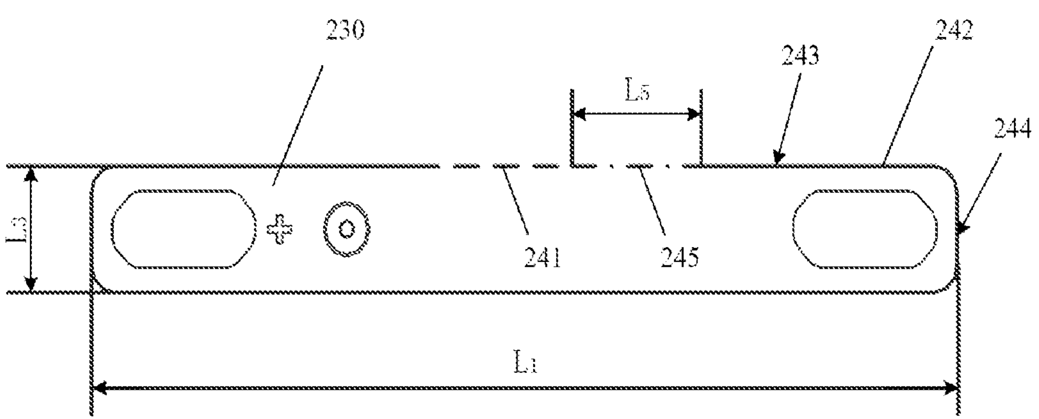
FIG. 13 is a top view of yet another battery cell disclosed in an embodiment of the present application.

Referring to FIG. 13, FIG. 13 is a top view of yet another battery cell 20 according to an embodiment of the present application. In yet another embodiment, along the circumferential direction of the end cover 230, a third connection area 245 is further provided between the first connection area 241 and the second connection area 242. The strength of the third connection area 245 gradually decreases from a connection position between the third connection area 245 and the second connection area 242 to a connection position between the third connection area 245 and the first connection area 241. The minimum strength of the third connection area 245 is not less than the strength of the first connection area 241, and the maximum strength of the third connection area 245 is not greater than the strength of the second connection area 242.

In order to illustrate the position of the third connection area 245, the third connection area 245 is shown by a dotted line in FIG. 13.

The third connection area 245 is a part of the connection area 240 connecting the first connection area 241 with the second connection area 242. The strength of the third connection area 245 is gradually changed, and the third connection area 245 has a first end and a second end, where the first end connecting with the first connection area 241 while the second end connecting with the second connection area 242. The strength of the third connection area 245 gradually increases along the direction from the first end to the second end. In order to achieve a better transition effect, the minimum strength of the third connection area 245 may be equal to the strength of the first connection area 241, and the maximum strength of the third connection area 245 may be equal to the strength of the second connection area 242.

The third connection area 245 is a transition area capable of achieving a transition from the first connection area 241 to the second connection area 242. In this way, a welding device does not need to be stopped during the welding process of the case 210 and the end cover 230, instead, the welding parameters can be adjusted during welding so as to improve the welding efficiency. In addition, by providing the third connection area 245 as a transition area, stress concentration can also be reduced.

In some embodiments, the end cover 230 and the case 210 are connected by welding, and the weld penetration of the third connection area 245 gradually decreases from a connection position between the third connection area 245 and the second connection area 242 to a connection position between the third connection area 245 and the first connection area 241. The minimum weld penetration of the third connection area 245 is not less than the weld penetration of the first connection area 241, and the maximum weld penetration of the third connection area 245 is not greater than the weld penetration of the second connection area 242.

The weld penetration of the third connection area 245 gradually increases along the direction from the first end to the second end. In order to achieve a better transition effect, the minimum weld penetration of the third connection area 245 may be equal to the weld penetration of the first connection area 241, and the maximum weld penetration of the third connection area 245 may be equal to the weld penetration of the second connection area 242.

Since the strength of the weld seam is positive correlated with the weld penetration, and the deeper the weld penetration, the higher the strength of the weld seam. The weld penetration of the third connection area 245 gradually changes, so as to transition from the first connection area 241 to the second connection area 242.

Please refer to FIG. 13, in some embodiments, along the circumferential direction of the end cover 230, the circumference of the connection area 240 connecting the case 210 with the end cover 230 is $L_4$, and the length of the third connection area 245 is $L_5$, satisfying: $L_5 \leq 0.1L_4$.

When the third connection area 245 is arranged on the long side 243, the length of the third connection area 245 is the distance between the two ends thereof. When the third connection area 245 is arranged on the long side 243 and the short side 244 at the same time, the length thereof is the sum of the length of the part on the long side 243 and the length of the part on the short side 244. When the third connection area 245 is in a circular arc shape, the length of the third connection area 245 is the arc length of the circular arc.

The length value of the third connection area 245 may be: $L_5=0.1L_4$, $0.09L_4$, $0.08L_4$, $0.07L_4$, $0.06L_4$, $0.05L_4$, $0.04L_4$, $0.03L_4$, or the like.

The length of the third connection area 245 is less than or equal to 0.1 times the circumference of the connection area 240, so that the lengths of the first connection area 241 and the second connection area 242 are relatively long. If $L_5>0.1L_4$, the length of the third connection area 245 is relatively long, and correspondingly, the lengths of the first connection area 241 and the second connection area 242 may be shortened, which may affect the opening size after the first connection area 241 bursts or affect the connection strength between the end cover 230 and the case 210.

In some embodiments, the battery cell 20 includes a plurality of first connection areas 241, the plurality of first connection areas 241 are arranged at intervals along the circumferential direction of the end cover 230.

The battery cell 20 may include two first connection areas 241, three first connection areas 241, four first connection areas 241, or more than four first connection areas 241.

By providing a plurality of first connection areas 241, when the internal pressure of the battery cell 20 reaches a certain threshold, all the plurality of first connection areas 241 can burst to relieve pressure, so as to improve the pressure relief speed, which is conducive to improve the safety of the battery 10.

Figure 14:
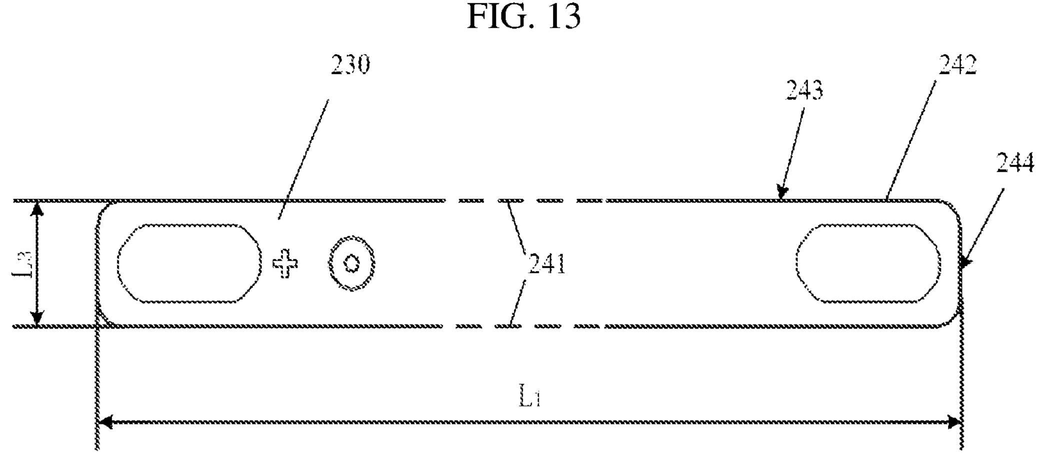
FIG. 14 is a top view of a battery cell including two first connection areas disclosed in an embodiment of the present application.

Please refer to FIG. 14, FIG. 14 is a top view of a battery cell 20 including two first connection areas 241 according to an embodiment of the present application. In some embodiments, the battery cell 20 includes two first connection areas 241, and the two first connection areas 241 are oppositely arranged.

Both of the two first connection areas 241 may be oppositely arranged on the long side 243 along the width direction. Alternatively, both of the two first connection areas 241 may be oppositely arranged on the short side 244 along the length direction. Both of the two first connection areas 241 may also be circular arcs, and the two first connection areas 241 are respectively located on two ends of the diameter, so as to be oppositely arranged.

The two first connection areas 241 being oppositely arranged, so that the two first connection areas 241 are not likely to interference with each other, and are capable of relieving pressure independently.

Figure 15:
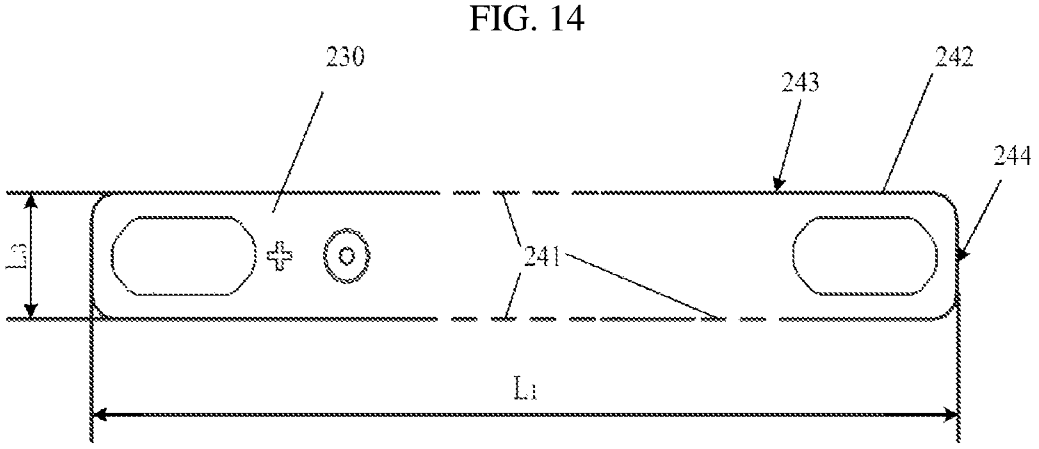
FIG. 15 is a top view of a battery cell including three first connection areas disclosed in an embodiment of the present application.

Please refer to FIG. 15, FIG. 15 is a top view of battery cell 20 including three first connection areas 241 disclosed in an embodiment of the present application. In other embodiments, the battery cell 20 includes three first connection areas 241, the three first connection areas 241 are arranged at intervals along the circumferential direction of the end cover 230. All of the three first connection areas 241 may be arranged on one long side 243, or may be arranged on two long sides 243, or may be partially arranged on the long side 243 while the remaining arranged on the short side 244.

An embodiment of the present application further provides a battery 10, comprising the above-mentioned battery cells 20.

An embodiment of the present application further provides an electrical device, comprising the above-mentioned battery 10, where the battery 10 is configured to provide electric energy for the electrical device.

For some embodiments of the present application, please refer to FIG. 4 to FIG. 15.

Embodiments of the present application provide a battery cell 20, comprising a case 210, an electrode assembly 220, and an end cover 230. The case 210 has an opening, the electrode assembly 220 is accommodated within the case 210, and the end cover 230 closes the opening. The end cover 230 is in sealed connection with the case 210 through the first connection area 241 and the second connection area 242, and the strength of the first connection area 241 is less than the strength of the second connection area 242. The first connection area 241 is configured to be actuated to release internal pressure of the battery cell 20 when the internal pressure exceeds a threshold. The end cover 230 and the case 210 are connected by welding, and the weld penetration of the first connection area 241 is less than the weld penetration of the second connection area 242. When the internal pressure of the battery cell 20 exceeds a threshold, due to the weak sealing, the first connection area 241 between the end cover 230 and the case 210 will burst to release pressure when the internal pressure of the battery cell 20 reaches a certain threshold certain threshold so as to ensure safety of the battery 10. This solution can take the place of the existing explosion-proof valve technology to reduce the manufacturing cost of the battery cells 20, and further reduce the space occupied by the battery cells 20 and assembly processes. The strength of the weld seam is positive correlated with the weld penetration, and the deeper the weld penetration, the higher the strength of the weld seam. When the end cover 230 of the battery cell 20 and the case 210 are connected by welding, the weld penetration of the first connection area 241 is less than the weld penetration of the second connection area 242, so the strength of the first connection area 241 is less than the strength of the second connection area 242, so that the first connection area 241 serves as a weak sealing area to burst when the internal pressure of the battery cell 20 exceeds a certain threshold so as to release pressure.

The connection area 240 connecting the end cover 230 with the case 210 extends along a rectangular trajectory, the connection area 240 includes a long side 243 and a short side 244, where the length of the long side 243 is greater than the length of the short side 244. The length of the long side 243 is $L_1$, which satisfies: $L_1 \geq 50$ mm. The first connection area 241 is arranged on the long side 243, and the length of the first connection area 241 is $L_2$, which satisfies: $L_1/3 \leq L_2 \leq L_1/2$. And/or the first connection area 241 is arranged on the short side 244 of the connection area 240, the length of the short side 244 is $L_3$, which satisfies: $L_3/2 \leq L_2 \leq 3L_3/4$. When the first connection area 241 is arranged on the long side 243, the length of the first connection area 241 is ⅓-½ of the size of the long side 243, so that under the premise of satisfying the connection strength between the end cover 230 and the case 210, the first connection area 241 can be relatively long. When the first connection area 241 is arranged on the short side 244, because the short side 244 is close to the corner (an intersection position of the short side 244 and the long side 243), it can be strengthened by the corner (the strength at the corner is large), so the length of the first connection area 241 can be set larger. The length of the first connection area 241 is ½-¾ of the size of the short side 244, so that under the premise of satisfying the connection strength between the end cover 230 and the case 210, the first connection area 241 can be relatively long.

The length of the long side 243 is $L_1$, which satisfies: $L_1 < 50$ mm. The first connection area 241 is arranged on the long side 243. When the length of the long side 243 is less than 50 mm, the length of the short side 244 is too short, and it is not appropriate to arrange the first connection area 241 on the short side 244 alone (at this time, if the first connection area 241 is arranged on the short side, the first connection area 241 is not easy to burst, and even it bursts, the formed opening is small, which is not conducive to rapid pressure relief). At this time, the first connection area 241 is arranged on the long side 243.

The length of the long side 243 is $L_1$, which satisfies: $L_1 < 50$ mm. The first connection area 241 includes a first segment 2411, a second segment 2412 and a third segment 2413 that are sequentially connected, the first segment 2411 and the third segment 2413 are respectively located on two opposite long sides 243, and the second segment 2412 is located on a short side 244 of the connection area 240. When the length of the long side 243 is less than 50 mm, the first connection area 241 may completely occupy one short side 244 and occupy a part of each of the two long sides 243 at the same time. The first connection area 241 may form a U-shaped structure. In this way, the first connection area 241 is easy to burst when the internal pressure of the battery cell 20 exceeds a certain threshold, and the opening after the burst is large, which is conducive to rapid pressure relief.

Along the circumferential direction of the end cover 230, a third connection area 245 is further provided between the first connection area 241 and the second connection area 242, the strength of the third connection area 245 gradually decreases from a connection position between the third connection area 245 and the second connection area 242 to a connection position between the third connection area 245 and the first connection area 241. The minimum strength of the third connection area 245 is not less than the strength of the first connection area 241, and the maximum strength of the third connection area 245 is not greater than the strength of the second connection area 242. The third connection area 245 is a transition area capable of achieving a transition from the first connection area 241 to the second connection area 242. In this way, a welding device does not need to be stopped during the welding process of the case 210 and the end cover 230, instead, the welding parameters can be adjusted during welding so as to improve the welding efficiency. In addition, by providing the third connection area 245 as a transition area, stress concentration can also be reduced.

The above are only preferred examples of the present application, and are not intended to limit the present application. For a person skilled in the art, the present application may have various modifications and variations. Any modification, equivalent substitution, improvement, and the like made within the spirit and principle of the present application shall fall within the protection scope of the present application.

What is claimed is:

1. A battery cell, comprising:

a case with an opening;

an electrode assembly accommodated within the case; and an end cover closing the opening, wherein the end cover is in sealed connection with the case through a first connection area and a second connection area along a circumferential direction of the end cover, the strength of the first connection area is less than the strength of the second connection area, and the first connection area is configured to be actuated to release an internal pressure of the battery cell when the internal pressure exceeds a threshold; and wherein, along the circumferential direction of the end cover, a third connection area is further provided between the first connection area and the second connection area, and the strength of the third connection area gradually decreases from a connection position between the third connection area and the second connection area to a connection position between the third connection area and the first connection area, the minimum strength of the third connection area is not less than the strength of the first connection area, and the maximum strength of the third connection area is not greater than the strength of the second connection area.

2. The battery cell according to claim 1, wherein the end cover and the case are connected by welding, and a weld penetration of the first connection area is less than a weld penetration of the second connection area.

3. The battery cell according to claim 2, wherein the weld penetration of the first connection area is not greater than two-thirds of the weld penetration of the second connection area.

4. The battery cell according to claim 2, wherein the weld penetration of the first connection area is $H_1$, which satisfies: 0.1 mm$\leq H_1 \leq$0.4 mm; and/or the weld penetration of the second connection area is $H_2$, which satisfies: 0.6 mm$\leq H_2 \leq$0.9 mm.

5. The battery cell according to claim 2, wherein the end cover is substantially rectangular, the end cover comprises a long side and a short side, and a length of the long side is greater than a length of the short side.

6. The battery cell according to claim 5, wherein the length of the long side is $L_1$, which satisfies: $L_1 \geq 50$ mm;

the first connection area is arranged on the long side, and the length of the first connection area is $L_2$, which satisfies: $L_1/3 < L_2 \leq L_1/2$; and/or the first connection area is arranged on the short side, and the length of the short side is $L_3$, which satisfies: $L_3/2 \leq L_2 \leq 3L_3/4$.

7. The battery cell according to claim 5, wherein the length of the long side is $L_1$, which satisfies: $L_1 < 50$ mm; and the first connection area is arranged on the long side.

8. The battery cell according to claim 5, wherein the length of the long side is $L_1$, which satisfies $L_1 < 50$ mm; and the first connection area comprises a first segment, a second segment, and a third segment that are sequentially connected, the first segment and the third segment are respectively located on two opposite long sides, and the second segment is located on a short side.

9. The battery cell according to claim 2, wherein the end cover is in circular shape, and the first and the second connection areas connecting the end cover with the case extend along a circular trajectory.

10. The battery cell according to claim 9, wherein, along a circumferential direction of the end cover, a length of the first connection area is $L_2$, and a length of the second connection area is $L_4$, which satisfies: $0.2L_4 \leq L_2 \leq 0.35L_4$.

11. The battery cell according to claim 1, wherein the end cover and the case are connected by welding, a weld penetration of the third connection area gradually decreases from the connection position between the third connection area and the second connection area to the connection position between the third connection area and the first connection area, a minimum weld penetration of the third connection area is not less than the weld penetration of the first connection area, and a maximum weld penetration of the third connection area is not greater than the weld penetration of the second connection area.

12. The battery cell according to claim 1, wherein, along the circumferential direction of the end cover, a total length of the first and the second connection areas connecting the end cover with the case is $L_4$, and a length of the third connection area is $L_5$, which satisfies: $L_5 \leq 0.1L_4$.

13. The battery cell according to claim 1, wherein the battery cell comprises a plurality of first connection areas, and the plurality of first connection areas are arranged at intervals along the circumferential direction of the end cover.

14. The battery cell according to claim 13, wherein the battery cell includes two first connection areas, and the two first connection areas are oppositely arranged.

15. A battery, comprising the battery cell of claim 1.

16. An electrical device, comprising the battery according to claim 15, wherein the battery is configured to provide electric energy for the electrical device.

* * * * *